(12) United States Patent
Deshpande

(10) Patent No.: US 8,422,779 B2
(45) Date of Patent: Apr. 16, 2013

(54) IMAGE DATA PROCESSING FOR MORE EFFICIENT COMPRESSION

(75) Inventor: Tarang Deshpande, Rancho Mirage, CA (US)

(73) Assignee: Orions Digital Technologies, Inc., Snoqualmie, WA (US)

( * ) Notice: Subject to any disclaimer, the term of this patent is extended or adjusted under 35 U.S.C. 154(b) by 205 days.

(21) Appl. No.: 13/010,650

(22) Filed: Jan. 20, 2011

(65) Prior Publication Data

US 2012/0189215 A1    Jul. 26, 2012

(51) Int. Cl.
*G06K 9/36* (2006.01)
(52) U.S. Cl.
USPC ............ 382/166; 382/162; 382/232; 382/245
(58) Field of Classification Search .................. 382/166, 382/162, 232, 236, 238, 245, 240, 248; 358/1.9; 348/476, 460, 578, 581; 375/240, E7.13; 707/693; 712/E9.018
See application file for complete search history.

(56) References Cited

U.S. PATENT DOCUMENTS

| | | | |
|---|---|---|---|
| 3,813,845 A * | 6/1974 | Weikert | 53/469 |
| 6,259,819 B1 * | 7/2001 | Andrew et al. | 382/248 |
| 7,958,016 B2 * | 6/2011 | Huaulme et al. | 705/26.1 |

* cited by examiner

*Primary Examiner* — Anh Hong Do
(74) *Attorney, Agent, or Firm* — Lee & Hayes, PLLC

(57) ABSTRACT

The present disclosure is directed to methods, systems, and apparatus for improved data compression. In one embodiment, a method is provided that separates image data by color channels and ordered bit planes. The method includes arranging bytes representing pixel values from a source image into corresponding color channels. Bits in each color channel are separated into a plurality of bit planes that are ordered based on significance. Then, the method may combine bits associated with adjacent pixel locations from common bit planes into new bytes. Once the image data is separated in this way, different compression processes are applied to data sets represented in the ordered bit planes.

15 Claims, 10 Drawing Sheets
(3 of 10 Drawing Sheet(s) Filed in Color)

| BIT | B(1,1) | B(1,2) | B(1,3) | B(1,4) | B(1,5) | B(1,6) | B(1,7) | B(1,8) | B(1,y) |
|---|---|---|---|---|---|---|---|---|---|
| 7 | 1 | 1 | 1 | 1 | 1 | 1 | 1 | 1 | |
| 6 | 1 | 0 | 1 | 1 | 1 | 0 | 1 | 0 | |
| 5 | 1 | 1 | 1 | 0 | 1 | 1 | 1 | 1 | |
| 4 | 0 | 1 | 1 | 0 | 1 | 0 | 0 | 1 | |
| 3 | 1 | 1 | 1 | 0 | 0 | 0 | 0 | 1 | |
| 2 | 0 | 0 | 1 | 1 | 0 | 0 | 1 | 1 | |
| 1 | 1 | 1 | 0 | 1 | 0 | 0 | 1 | 0 | |
| 0 | 1 | 1 | 0 | 1 | 0 | 0 | 1 | 1 | |

*FIG. 2A*

| BIT | B(1,1) | B(1,2) | B(1,3) | B(1,4) | B(1,5) | B(1,6) | B(1,7) | B(1,8) | B(1,y) |
|---|---|---|---|---|---|---|---|---|---|
| 7 | 1 | 1 | 1 | 1 | 1 | 1 | 1 | 1 | |
| 6 | 1 | 0 | 1 | 1 | 1 | 0 | 1 | 0 | |
| 5 | 1 | 1 | 1 | 0 | 1 | 1 | 1 | 1 | |
| 4 | 0 | 1 | 1 | 0 | 1 | 0 | 0 | 1 | |
| 3 | 1 | 1 | 1 | 0 | 0 | 0 | 0 | 1 | |
| 2 | 0 | 0 | 1 | 1 | 0 | 0 | 1 | 1 | |
| 1 | 1 | 1 | 0 | 0 | 0 | 0 | 1 | 0 | |
| 0 | 1 | 1 | 0 | 1 | 0 | 0 | 1 | 1 | |

*FIG. 2B*

IMAGE DATA PROCESSING FOR MORE EFFICIENT COMPRESSION

BACKGROUND

With the growth in network connectivity, it is increasingly important to maximize the utilization of available resources such as storage and network bandwidth. The consumption of multimedia data (e.g., audio, video, graphics, etc.) on various network-enabled devices is only adding to the demands being placed on these resources. One skilled in the art will recognize that multimedia data is information-intensive when compared to other data types and requires substantially more storage and transmission resources. In this regard, data networks are increasingly being relied on for the transmission of multimedia data such as audio (telephone calls, streaming music, Podcasts, etc.) and video data (television, movies, video conferences, etc.), just to name a few. The continued growth and the utility of data networks (i.e., the Internet, cellular networks, etc.) may depend, at least in part, on the ability to more efficiently transmit and store data.

Data compression refers to the application of one or more processes that reduce the amount of space and/or bandwidth used in storing and/or transmitting data. For example, a data compression process may identify and reduce the redundancy of bits (or other information unit) in a multimedia file or stream. The compression process translates or encodes the data from an original representation into an encoded format that is more compact. A smaller amount of information is used to represent the data in the encoded format thereby conserving storage and transmission resources. To decode the data, a decoding process is applied that returns the data into its original format. In the interest of connectivity and efficiency, most systems exchange multimedia data such as digital video and audio streams in a compressed format. Accordingly, achieving improved compression rates allows these systems to better utilize computer resources and network infrastructure.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure is directed to methods, systems, and apparatus for improved data compression. In one embodiment, a method is provided that separates image data by color channels and ordered bit planes. The method includes arranging bytes representing pixel values from a source image into corresponding color channels. Bits in each color channel are separated into a plurality of bit planes that are ordered based on significance. Then, the method may combine bits associated with adjacent pixel locations from common bit planes into new bytes. Once the image data is separated in this way, different compression processes are applied to data sets represented in the ordered bit planes.

DESCRIPTION OF THE DRAWINGS

The patent or application file contains at least one figure executed in color. Copies of this patent or patent application publication with color figures will be provided by the Office upon request and payment of the necessary fee. The foregoing aspects and many of the attendant advantages of the disclosed subject matter will become more readily appreciated as the same becomes better understood by reference to the following detailed description, when taken in conjunction with the accompanying drawings, wherein:

FIGS. 2A-B are diagrams of exemplary bit maps that illustrate various aspects of the present disclosure;

DETAILED DESCRIPTION

Generally described, the present disclosure is directed to methods, systems, and apparatus for improved data compression. In one embodiment, the data compression functionality disclosed herein is described in the context of compressing certain types of data such as video data. Accordingly, the examples provided below may describe functionality in terms of compressing an image or a sequence of images. However, those skilled in the art and others will recognize that the present disclosure may be used to compress or encode other types of data without departing from the scope of the claimed subject matter. Moreover, the illustrative examples and descriptions provided below are not intended to be exhaustive or to limit the present disclosure to the precise forms described. Similarly, any steps described below may be interchangeable or used in conjunction with other steps or combinations of steps in order to achieve the same, or substantially similar, result.

Now with reference to FIG. 1, a method 100 in accordance with embodiments of the present disclosure will be described. The amount of compression that may be achieved is substantially affected by the degree of correlation in a signal or data set. However, existing video encoders and compression frameworks do not adequately account for the different types of data in a video signal. Improved compression may be achieved through the application of variable compression methods that are more optimal for particular data sets. In general, the methods, systems, and apparatus provided by the present disclosure including the method 100 described with reference to FIG. 1 are directed to applying more optimal compression techniques to different sets of image data.

Figure 1:
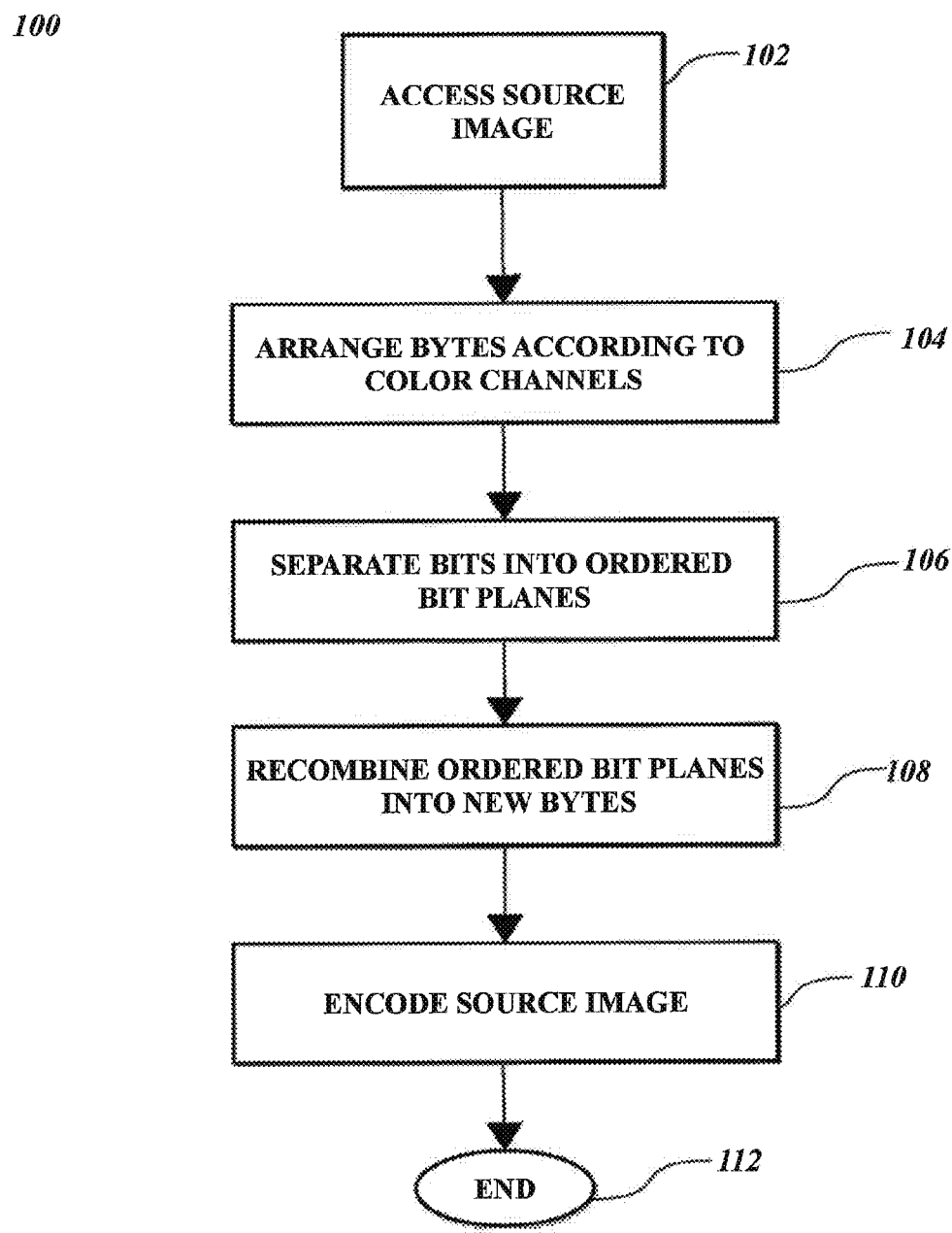
FIG. 1 is a flow diagram illustrating a method for separating image data to facilitate more-efficient compression in accordance with one embodiment with the present disclosure.

As illustrated in FIG. 1, the method 100 begins at block 102 where a source image is obtained or otherwise accessed. In various embodiments, the method 100 is configured to receive and process source images in a video sequence. Source images may include, but are not limited to, video data, video sequences, groups of pictures, pictures, images, regions, objects, frames, slices, macro-blocks, pixels, signals, among others. As known in the art, a source image may be an image in a video sequence comprising a plurality of RGB (Red, Green, Blue) pixel values. In this regard, the RGB values of a pixel may be stored as three consecutive 8-bit numbers (frequently referred to as bytes). The value of one primary color may be combined with the values associated with the other primary colors to derive a final color for a pixel. In this regard, a source image may comprise or be converted between other types of signals including, but not limited to, YUV, CMYK, Greyscale, HSV, and HSL signals, without departing from the scope of the present disclosure. Moreover, the description provided herein is equally applicable to other types of electromagnetic wavelengths other than visible light, such as infrared, ultraviolet, etc.

At block 104 of the method 100, bytes representing pixel values in the source image are arranged according to color channels. A pixel in an RGB image typically has values stored as three consecutive 8-bit numbers. At 8 bits per pixel, there may be $2^8$ bits which represent 256 values for each of three primary colors. The maximum value of the color red, for example, may be represented by the bit pattern "11111111" base 2 or "255" base 10. The number 0 represents the lack of color and 255 is the maximum intensity for the color. If we change the highest order bit to zero, the result is "01111111" base 2 or "127" base 10. The value represented in this "red" byte may be combined with the two other primary colors and be perceived as a single, blended color. While the description provided herein is made in the context of 8-bit color values, this is merely exemplary as the present disclosure may be used in conjunction with 10-bit, 12-bit, 14-bit, etc., systems without departing from the scope of the claimed subject matter.

With existing systems, bytes that represent a value of a particular primary color are typically processed in a linear manner. In this regard, suppose we have an image frame comprised of a set of a 24-bit RGB values. Then, a linear ordering of the bytes in the image may be represented as follows:

TABLE 1

| | | | |
|---|---|---|---|
| $R_{(1,1)} G_{(1,1)} B_{(1,1)}$ | $R_{(1,2)} G_{(1,2)} B_{(1,2)}$ | $R_{(1,3)} G_{(1,3)} B_{(1,3)}$ | $R_{(1,H)} G_{(1,H)} B_{(1,H)}$ |
| $R_{(2,1)} G_{(2,1)} B_{(2,1)}$ | $R_{(2,2)} G_{(2,2)} B_{(2,2)}$ | $R_{(2,3)} G_{(2,3)} B_{(2,3)}$ | $R_{(2,H)} G_{(2,H)} B_{(2,H)}$ |
| $R_{(3,1)} G_{(3,1)} B_{(3,1)}$ | $R_{(3,2)} G_{(3,2)} B_{(3,2)}$ | $R_{(3,3)} G_{(3,3)} B_{(3,3)}$ | $R_{(3,H)} G_{(3,H)} B_{(3,H)}$ |
| $R_{(W,1)} G_{(W,1)} B_{(W,1)}$ | $R_{(W,2)} G_{(W,2)} B_{(W,2)}$ | $R_{(W,3)} G_{(W,3)} B_{(W,3)}$ | $R_{(W,H)} G_{(W,H)} B_{(W,H)}$ | where W ("width") represents the location of a given pixel in one component correction and H ("height") represents the location of the pixel in a second component correction. As indicated in TABLE 1, bytes representing each of the primary colors for a given pixel are typically grouped together by existing systems. In raw form, a computer commonly represents a pixel as a set of three samples totaling 24 bits as described and represented herein. However, pixels of greater color depth can be represented, for example, in samples totaling 30, 36, 42, and 48 bits or more. The illustrated linear ordering of bytes based on screen location corresponds to the order in which computer monitors and other devices access image data to render or otherwise display pixels on a screen. At block 104 of the method 100, bytes representing pixel values in the source image are arranged according to their corresponding color channel. In particular, for the image frame comprised of the same set of 24-bit RGB values represented in TABLE 1, bytes that represent the pixel values may be arranged, at block 104, in separate color channels as follows:

TABLE 2

| RED | GREEN | BLUE |
|---|---|---|
| $R_{(1,1)} R_{(1,2)} R_{(1,3)} \ldots R_{(1,H)}$ | $G_{(1,1)} G_{(1,2)} G_{(1,3)} \ldots G_{(1,H)}$ | $B_{(1,1)} B_{(1,2)} B_{(1,3)} \ldots B_{(1,H)}$ |
| $R_{(2,1)} R_{(2,2)} R_{(2,3)} \ldots R_{(2,H)}$ | $G_{(2,1)} G_{(2,2)} G_{(2,3)} \ldots G_{(2,H)}$ | $B_{(2,1)} B_{(2,2)} B_{(2,3)} \ldots B_{(2,H)}$ |
| $R_{(3,1)} R_{(3,2)} R_{(3,3)} \ldots R_{(3,H)}$ | $G_{(3,1)} G_{(3,2)} G_{(3,3)} \ldots G_{(3,H)}$ | $B_{(3,1)} B_{(3,2)} B_{(3,3)} \ldots B_{(3,H)}$ |
| $R_{(W,H)}$ | $G_{(W,H)}$ | $B_{(W,H)}$ | where W and H corresponds to the screen location of the pixel for a particular byte. The division of pixel data into separate color channels in this way assists in processing image data in various ways, as described in further detail below.

At block 106 of the method 100, bits associated with particular color channels are separated into ordered bit planes. As mentioned previously, a color value for a pixel may be stored or otherwise represented in a byte (i.e., $B_{(1,1)}$) comprised of an 8-bit number (i.e., "11101011"). Each byte in a color channel may be associated with a similarly ordered 8-bit number (i.e., $B_{(W,H)}$) where W and H correspond to a screen location of the corresponding pixel. At block 106, bits in a color channel are separated based on significance into ordered bit planes. Then, at optional block 108 of the method 100, bits in the bit planes may be recombined to form new bytes in a way that facilitates more efficient compression. The separation of bits associated with particular color channels and generation of new bytes at blocks 106-108 will be described in further detail below with reference to FIGS. 2A-B.

Now with reference to FIGS. 2A-B, an exemplary bitmap 200 suitable for illustrating the separation of bit planes and the potential formation of new bytes in accordance with the present disclosure will be described. The bitmap 200 depicted in FIG. 2A holds values for a color channel (i.e., "blue") in a plurality of columns 204-220 identified as follows: $\{B_{(1,1)} B_{(1,2)} B_{(1,3)} B_{(1,y)}\}$. Each of the columns 204-220 contains a byte representing values at a sample set of adjacent pixel locations. In this instance, the lowest order bits are represented in row 236 and the highest order bits are represented in row 222, with the successively lower order bit planes being represented in rows 224-234, respectively. Individual entries in the bitmap 200 have a bit value of either "0" or "1" that are ordered as represented in the "BIT" column 202. The bitmap 200 in FIG. 2A visually depicts an illustrative way in which a color channel may be separated into bit planes at block 106 of the method 100 (FIG. 1).

FIG. 2B depicts the same bit map 200 illustrated in FIG. 2A after bytes have been recombined at optional block 108 (FIG. 1). In the illustrative embodiment depicted in FIG. 2B, bits are re-combined to generate new bytes 250-264. As described in further detail below, image data separated based on color channel and bit planes in this way facilitates the application of variable compression techniques on different sets of image data. Although FIGS. 2A-B illustrates a bitmap 200 that has specific attributes, those skilled in the art will appreciate that the bitmap 200 may operate with more or fewer than all of the listed attributes. Moreover, the bitmap 200 merely illustrates a sample set of data for a particular color channel. However, in actual embodiments, data for each of the color channels across all screen locations are divided in the same or substantially similar way.

With reference again to FIG. 1, at block 110, the source image is encoded for network transmission, storage, etc. Additional aspects of the present disclosure may encode some or all of the source image using techniques described in further detail below. In addition or alternatively, a number of currently available or yet-to-be-developed encoders or "codecs" may be used to encode image data, at block 110. In this regard, existing codecs apply a compression algorithm to an image and/or image sequence that is designed to identify and reduce various types of redundancies. A generic compression algorithm that is commonly employed in numerous contexts is Run Length Encoding (RLE). In this type of encoding, runs of data, that is, sequences in which the same data value occurs in many consecutive data elements, are stored as a single data value and count, rather than as the original run. Stated differently, Run Length Encoding replaces a sequence (i.e., run) of consecutive symbols having the same value with the value and the length of the sequence. Generally described, the processing described with reference to FIG. 1 separates image data in a way that is more-optimal for Run Length Encoding. Accordingly, the present disclosure may be used in conjunction with third-party codecs/encoders to manipulate image data in a way that improves compression efficiency for any codec that utilizes Run Length Encoding. Once the image data is encoded, the method 100 described with reference to FIG. 1 proceeds to block 112, where it terminates.

It should be well understood that the method 100 may be used in conjunction with any number of existing or yet to be developed encoders or systems to improve compression efficiency. However, since the method 100 may be used by any type of application that processes image data, the examples provided above with reference to FIG. 1 should be construed as exemplary and not limiting. Moreover, the separation of image data into ordered bit-planes is beneficial in the application of additional, more effective, compression techniques as described in further detail below.

As is well understood in the art, entropy is used to quantify the disorder of a system and is related to the amount of information in a source. A highly ordered system (low entropy) can generally be described using fewer bits than a disordered system (high entropy). In one embodiment, bits of image data are manipulated to improve the statistical probability of encountering runs of symbols in the source. This processing provides order to image data (lower entropy) and improves the effectiveness of conventional compression algorithms (i.e., Run Length Encoding). Moreover, manipulation of the input symbols, as described above with reference to FIG. 1, facilitates the application of other, more effective, compression techniques. Conventional information theory asserts that the degree to which data may be compressed is limited by the entropy of the source. However, a string of bits from a source image has little meaning in itself. In this regard, context may be derived from the attributes of the input data and used to provide improved compression over what may be achieved without accounting for the attributes of the source data.

Figure 3:
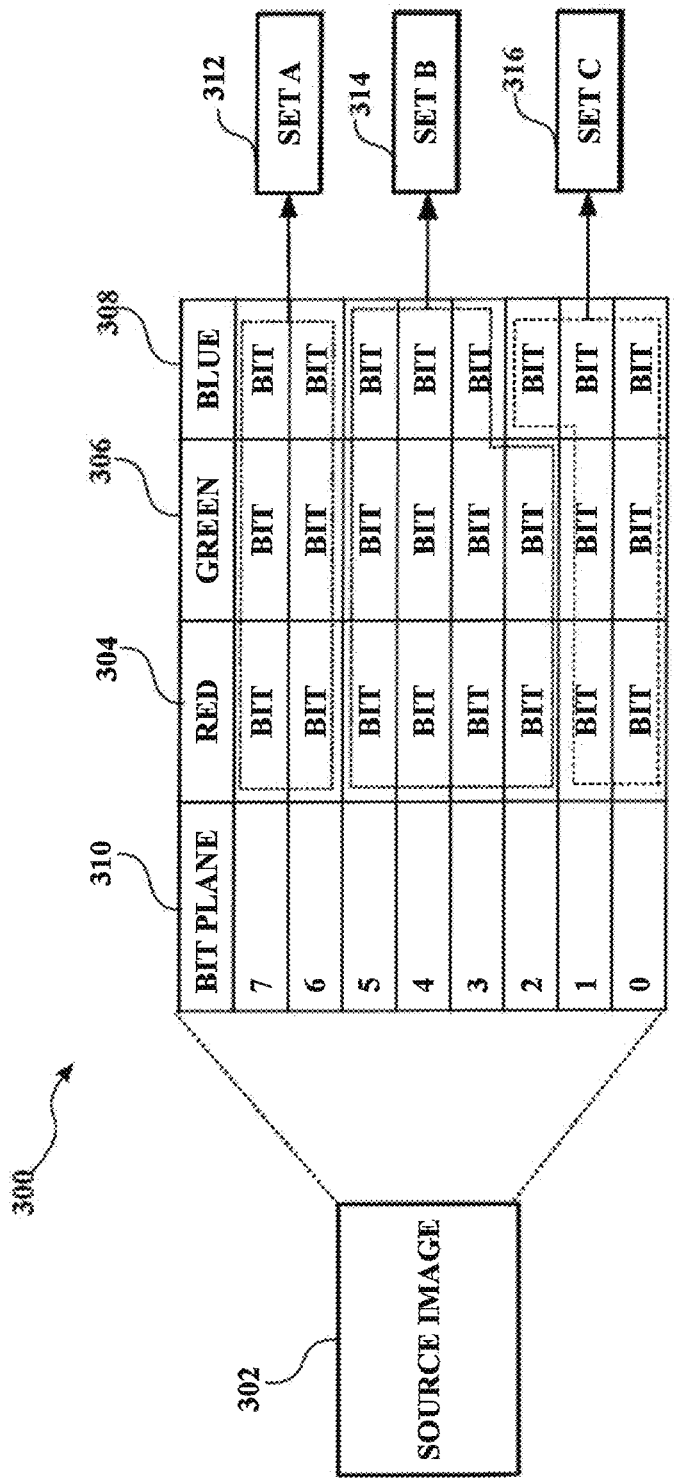
FIG. 3 is a block diagram of components that illustrate aspects of the present disclosure.

Now with reference to FIG. 3, an overview of a compression model provided by the present disclosure will be described. Generally stated, improvements in compression rates may be achieved by categorizing image data and applying more context-aware compression algorithms to particular data sets. With reference to FIG. 3 and in accordance with one embodiment, the source image 302 may be separated in the bitmap 300 into color channels, RED 304, GREEN 306, and BLUE 308. As described above with reference to FIG. 1, values in each color channel 304-308 may be separated into a plurality of BIT PLANES 310 which are ordered based on significance. In an exemplary embodiment, the image data is categorized into SET A 312, SET B 314, and SET C 316. The data sets 312-316 are encoded using different compression algorithms that are more optimal given attributes of the particular data set. As illustrated in FIG. 3, SET C 316 is comprised of the lowest order bits that, in this example, include bit planes 0, 1, and 2 for the BLUE color channel 308, and bits 0, and 1 for the RED and GREEN color channels 304-306, respectively. SET B 314 is comprised of the middle order bits that include bit planes 3, 4, and 5 for the BLUE color channel 308, and bit planes 2, 3, 4, and 5 for the RED and GREEN color channels 304-306, respectively. Moreover, SET A 312 is comprised of the highest order bits that include bit planes 6 and 7 for each of the RGB color channels 304-308. However, it should be well understood that the exemplary division of bit planes in the data sets 312-316 depicted in FIG. 3 should be construed as exemplary and not limiting. In alternative embodiments, particular bit planes may be arranged in different ways. Moreover, additional or fewer data sets may be defined without departing from the scope of the claimed subject matter.

As mentioned previously, the present disclosure is equally applicable in instances when images are represented in different types of signals such as YUV signals. In this regard, RGB signals may be transformed into a YUV signal comprising a Y (Luma) component representing brightness as well as U and V color difference components (Chrominance). As known in the art, the human visual system has poor acuity to color detail (U and V) when compared to its acuity for brightness (Y). Accordingly, in a YUV signal, the color difference information (U and V) is frequently subsampled to achieve compression. For example, upon a 4:2:2 subsampling of a YUV signal, half the color detail is discarded. Subsampling may be implemented by dropping, averaging, and/or weighting (taking contributions from many surrounding samples) of the color difference information (U and V). When one or more images are represented in a YUV signal, the data may be separated into YUV channels and bit planes ordered in a way that is analogous to RGB signals. Similar to the description provided above, the YUV image data may be categorized into data sets and encoded using compression algorithms that are more optimal given attributes of the particular data set. In this regard, the categorization of image data and compression techniques performed by the present disclosure will likely vary between different types of signals. However, the present disclosure may be applied to any type of signal that is capable of being separated into a plurality of data sets.

As illustrated in FIG. 3, a source image 302 may be viewed as a combination of data sets. Each of the data sets has attributes or properties affecting which compression techniques will be most efficient. As used herein, "efficiency" or "compression efficiency" refers to minimizing the number of bits used to represent image data while maximizing visual quality of a decoded image. In this regard, the most significant information in an image is represented in the highest order bit planes (i.e., SET A 312). As such, high-order bits tend to have substantial areas in which bit values are contiguous, as described in further detail below. On the other hand, the lowest order bit planes (i.e., SET C 316) are less significant and relatively disordered or random when compared to higher-order bit planes. Yet, existing encoders apply the same or substantially similar compression techniques to all data in the source image without sufficiently accounting for significance of the data. In general, more aggressive compression algorithms can and should be applied to the lower order bit planes (SET C 316) than the higher order bit planes (i.e. SET A 312).

Figure 4A:
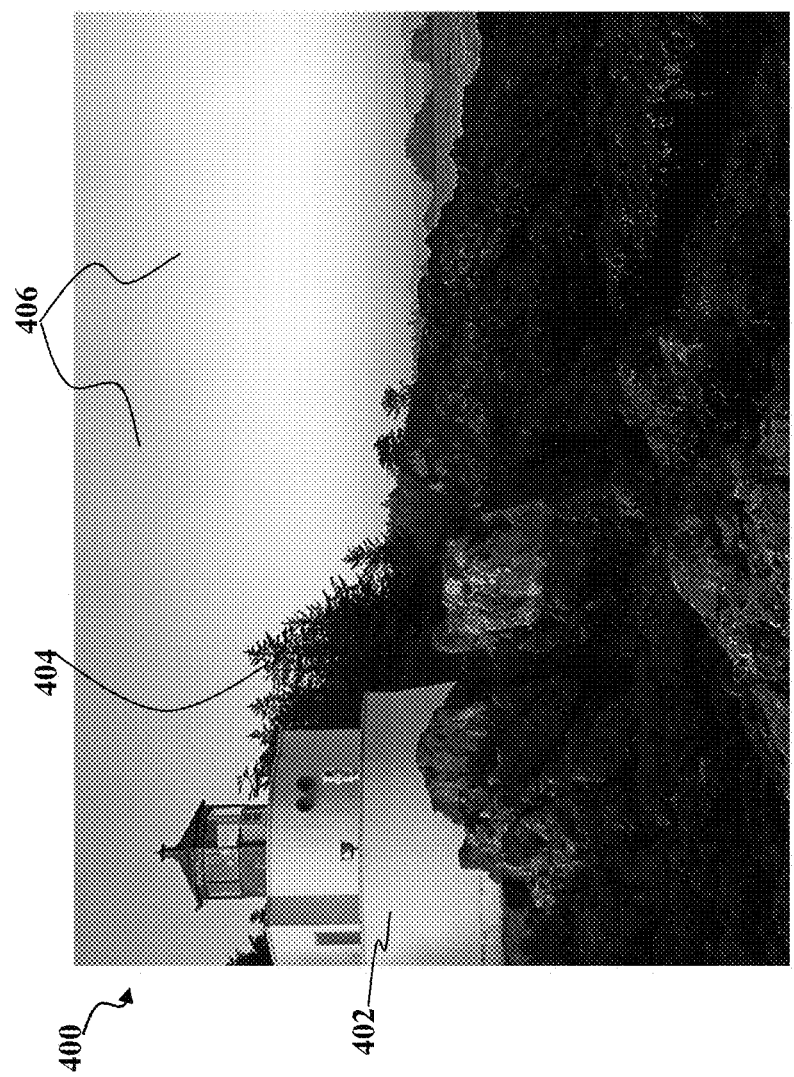
FIGS. 4A-C are pictorial depictions of images suitable for illustrating exemplary applications of the present disclosure.
Figure 4B:
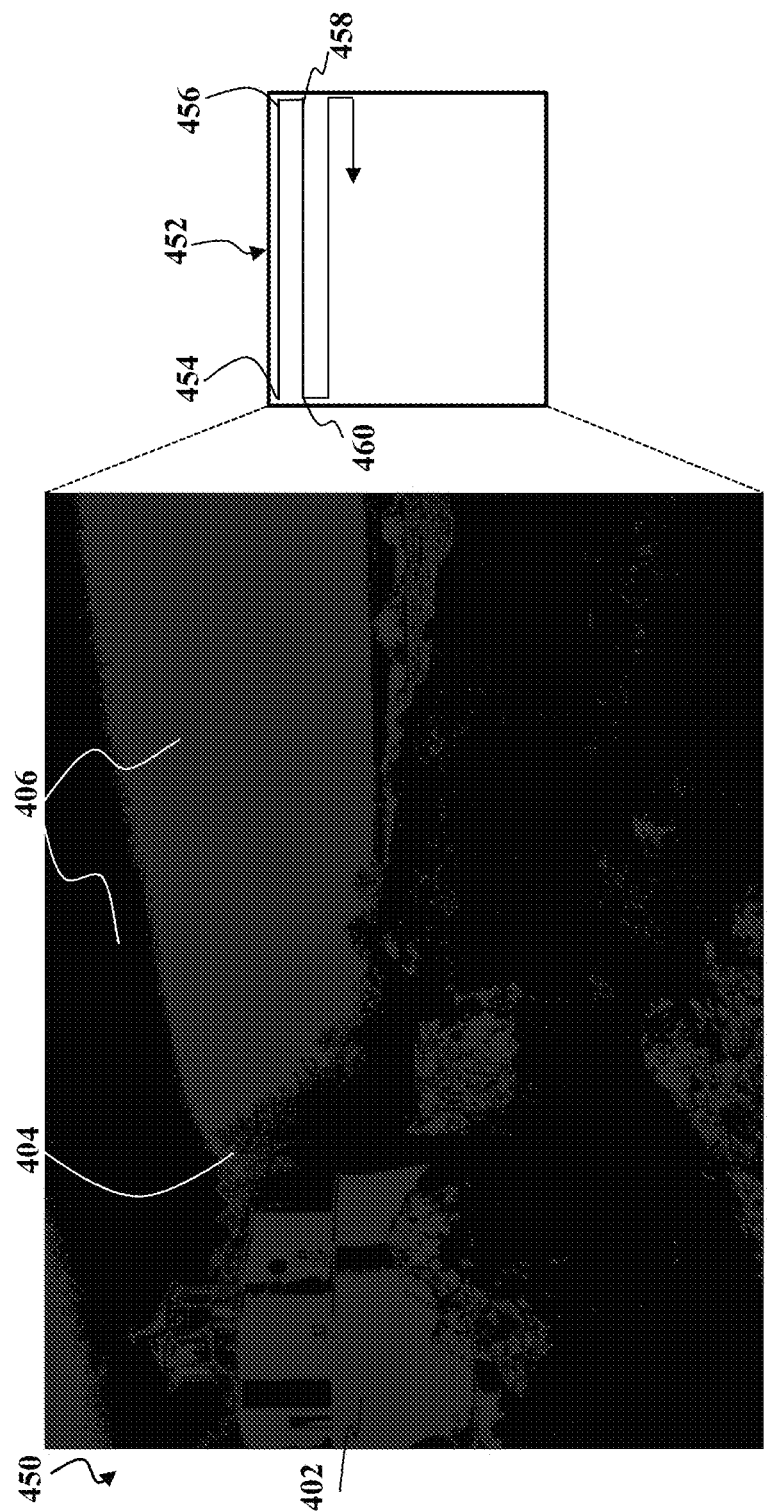
Figure 4C:
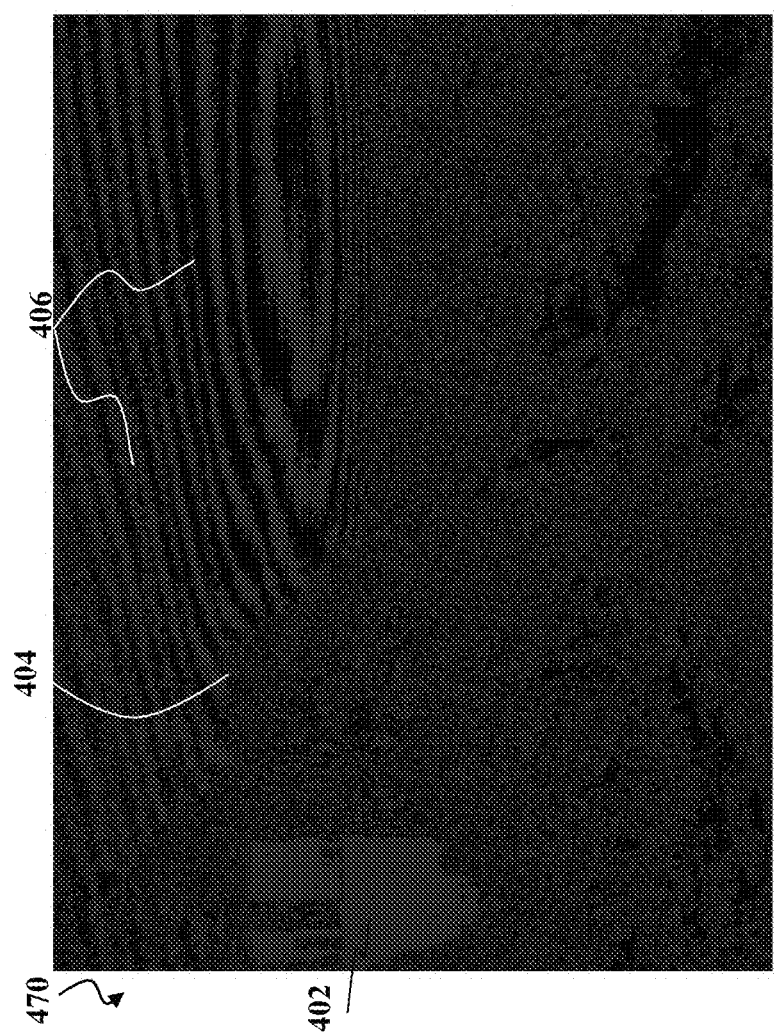

Now with reference to FIGS. 4A-C, additional embodiments of the present disclosure will be described. With reference to FIG. 4A, an image 400 depicting a number of image elements including the lighthouse 402, trees 404, and background 406 is shown. In this instance, pixel values for each of the color channels and their associated bit planes have been combined to render the final color values. As described above, the source image 400 may be separated into RGB color channels having bit planes that are ordered based on significance. In FIGS. 4B-C, representations of exemplary bit plane images 450 and 470 corresponding to the image 400 (FIG. 4A) on a particular color channel (i.e., red) and bit plane are shown. In particular, FIG. 4B includes a representation of the bit plane image 450 on the red color channel at bit plane level 6 ("R6"). The depiction of the R6 bit plane in FIG. 4B is representative as bit values in the higher-order bit planes tend to be contiguous over substantial areas. For example, in the screen area occupied by the lighthouse 402, trees 404, and background 406, the R6 bit plane is comprised of substantial areas where bit values are the same. Intermixing of different bit values only becomes more frequent on the R6 bit plane closer to the edges of certain elements such as the trees 404. FIG. 4C depicts a bit plane image 470 corresponding to the same image 400 depicted in FIG. 4A on the red color channel at bit plane level 2 ("R2"). As visually depicted in FIG. 4C, values in the R2 bit plane have less order than the R6 bit plane depicted in FIG. 4B. Stated differently, screen locations or areas associated with particular bit values are more randomized than occurs in the higher order bit planes (such as the R6 bit plane).

In accordance with one aspect, more context-aware compression methods are applied to data sets (i.e., SETS A-C 312-316) to improve compression efficiency. As mentioned previously, the method described above with reference to FIG. 1 separates image data by color channels and associated bit planes. Moreover, the present disclosure recognizes that a high degree of correlation exists between values of proximately located bits in the higher order bit planes. Arranging image data in 3-byte RGB values as taught by existing systems obfuscates this correlation. With the image data separated as described herein, the highest order bit planes (SET A 312) are organized in a way that is more optimal for being compressed using Run Length Encoding. In this regard, FIG. 4B depicts the bit plane image 450 suitable for illustrating a method of encoding image data in the higher-order bit planes (SET A 312). In this regard, the present disclosure scans a bit plane, such as the R6 bit plane, according to a scan pattern 452 beginning at position 454 and proceeding to position 456. Once the current line has been scanned, a subsequent line is scanned beginning at position 458 and proceeding to position 460. In this regard, all of the bit values in the R6 bit plane are scanned according to the scan pattern 452 visually depicted in FIG. 4B. In the encoding process, bit values in the higher-order bit planes are analyzed to identify contiguous sequences (runs). As contiguous runs of bit values are encountered, this data is encoded using Run Length Encoding. Since a high degree of correlation exists between proximately located bits on the same higher-order bit plane, the application of Run Length Encoding in this context is highly efficient.

Now with reference to FIG. 5, a method 500 for encoding image data by simulating values in the low order bit planes in accordance with embodiments of the present disclosure will be described. In general, the lowest order bit planes (SET C 316) contain the least significant data and represent the best opportunity for improved compression efficiency. However, existing encoders may compress image data without differentiating between data of varying significance. The nature of the attributes or patterns within bit planes varies in a way that substantially affects which compression methods or algorithms will be most efficient. For example, while higher-order bit planes tend to have substantial areas of contiguous values, data in the lower order bit planes holds information that is more random and therefore less susceptible to certain compression techniques such as Run Length Encoding. On the other hand, data in low order bit planes is more susceptible to being compressed using techniques that would be less effective if applied to the higher-order bit planes. Now with reference to FIG. 5, a method 500 for encoding image data from the low order bit planes (SET C 316) will be described.

Figure 5:
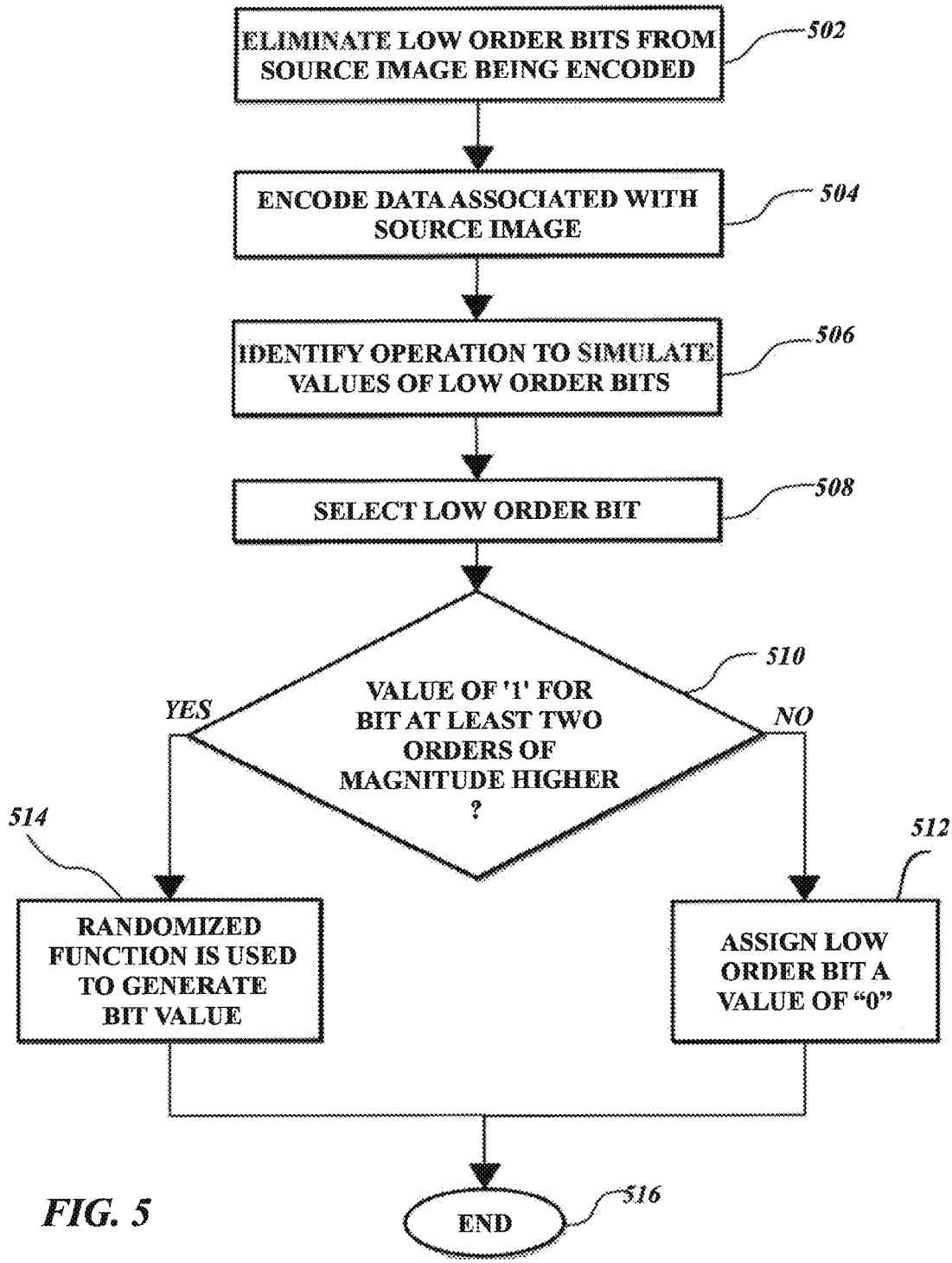
FIG. 5 is a flow diagram that depicts a method for encoding/decoding values in the low order bit planes in accordance with embodiments of the present disclosure.

As illustrated in FIG. 5, the method 500 begins at block 502 where the low order bits (SET C 316) are eliminated or dropped from a source image being encoded. As described above with reference to FIG. 3, a source image may be viewed as a combination of data sets that each have attributes or properties relevant for separately compressing the individual data sets. In this regard, the significance of the data and nature of the patterns within the low order bit planes is substantially different than the high-order bit planes. As described in further detail below, the values in the low order bit planes may be simulated when decoding an image. In accordance with one embodiment, low order bits (SET C 316) are dropped from the image data to achieve improved compression efficiency. However, merely eliminating the lowest order bits would result in unacceptable visual degradation. In particular, the lower order bits contribute texture to the appearance of an image. Merely dropping the low order bits would result in images appearing to be unnaturally flat. In addition, other types of visual degradation such as macro-blocking, artifact, etc., may also occur if low order bits were eliminated without being simulated. Accordingly, and as described in further detail below, values of the lowest order bit planes are simulated at the time of decoding in a way that does not perceptively impact the visual quality of a rendered image.

At block 504 of the method 500, an image is encoded in which low order bits have been dropped. Various embodiments of the present disclosure are generally directed to digital encoding, decoding, and processing of digital media content, such as video, images, pictures, etc. In some embodiments, the functionality of the present disclosure is implemented in conjunction with one or more existing or yet to be developed video codecs and/or standards. An apparatus provided by the present disclosure, as described in further detail below with reference to FIG. 7, may include a video encoder arranged to encode digital video information into a video stream or bitstream in which the lowest order bit planes (SET C 316) are dropped. Within the encoded bitstream, the encoder may report or otherwise memorialize which compression methods were used to compress particular data sets in the image. The precise manner in which the compression methods are communicated is not crucial to the present disclosure and may be implemented in a number of different ways.

At block 506 of the method 500, an operation to simulate low order bits of an encoded image is identified. When decoding a received bit stream, processing is performed to simulate the values in the low order bits. Subsequent to identification of a decoding operation, each of the low order bits is sequentially selected at block 508 of the method 500. Then, at block 510, a determination is made regarding whether a more significant bit at least two orders of magnitude higher than the selected bit has a value of "1." As mentioned previously, values of low order bits tend to be more random than values in the higher-order bit planes. Also, the low order bits are less perceptible and have a relatively smaller impact on image features than values in the higher order bit planes. In one embodiment, the higher order bits are used to intelligently generate simulated values for the previously dropped low order bits, as described in further detail below with reference to FIGS. 6A-B. In any event, the test performed at block 510 determines whether a more significant bit at least two orders of magnitude higher than the selected low order bit has a value of "1." If the result of the test performed at block 510 is "no," then the method 500 proceeds to block 512 where a value of "0" is assigned to the selected low order bit. If block 512 is reached, then the selected low order bit is not associated with a bit at least two magnitudes higher that has a value of "1." In this instance, the method 500 assigns a "0" value to the selected low order bit, as described in further detail below. On the other hand, if the selected low order bit is associated with a bit at least two orders of magnitude higher that has a value of "1," then the result of the test performed at block 510 is "yes." In this instance, the method 500 proceeds to block 514 where a randomizing function is used to generate and assign a value of either "0" or "1" to the selected low order bit. In one embodiment and as described in further detail below, the randomizing function is configured to generate an approximately equal number of "0"s and "1"s across a low order bit plane. As described in further detail below, the assignment of a particular bit value at block 512 or block 514 simulates values in the low order bit planes in a way that does not perceptively impact visual quality. Once all of the values in the low order bit planes have been simulated, the method 500 proceeds to block 516, where it terminates.

Figure 6B:
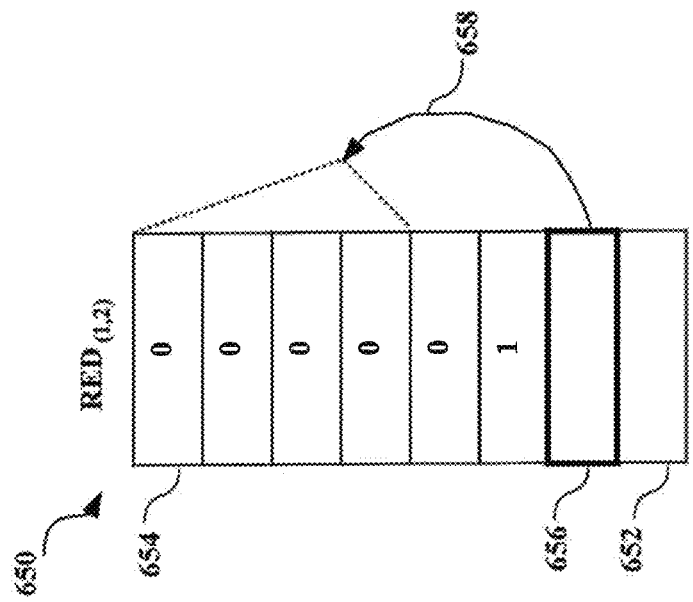
FIGS. 6A-B are diagrams of exemplary bytes suitable for illustrating various aspects of the present disclosure.
Figure 6A:
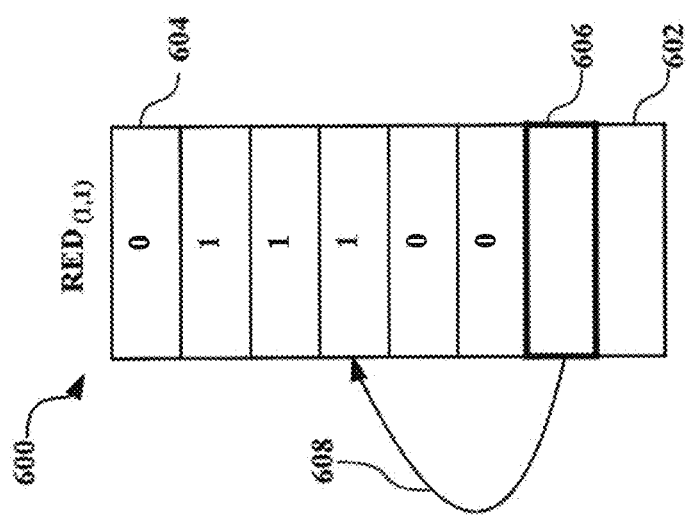

Now with reference to FIGS. 6A-B, additional description regarding the generation of values for the low order bit planes will be provided. As mentioned previously, the lowest order bits may be dropped when encoding an image. This aspect of the present disclosure is further illustrated in FIG. 6A which depicts a byte 600 having a plurality of ordered bit entries including the lowest and highest order bit entries 602 and 604, respectively. In this example, the byte 600 represents the color value of a pixel on an exemplary color channel ("RED") that was generated using, for example, the method 100 described above with reference to FIG. 1. As illustrated, the byte 600 does not include values for the lowest order bits. However, at the time of decoding, values are generated for the low order bits as mentioned previously with reference to FIG. 5. In the example depicted in FIG. 6A, the entry 606 for a low level bit is selected so that processing can be performed to assign the entry 606 a bit value. As described previously with reference to FIG. 5, values in the more significant higher-order bit planes may be used as an aid to intelligently generate a bit value for the entry 606. To this end, a determination is made regarding whether a more significant bit, at least two orders of magnitude higher than the selected bit entry 606, has a value of "1." In the example depicted in FIG. 6A, the selected low order bit entry 606 is associated with a three-orders-of-magnitude higher bit value of "1" as indicated by the arrow 608. In this instance when the result of the test performed at block 510 of the method 500 is "yes," a randomizing function is used to generate a bit value for the selected entry 606. As mentioned previously and in accordance with one embodiment, the randomizing function is configured to generate an approximately equal number of "0"s and "1"s when called.

Similar to FIG. 6A described above, FIG. 6B illustrates a byte 650 having a plurality of ordered bit entries including the lowest and highest order bit entries 652 and 654, respectively. Moreover, the byte 650 depicted in FIG. 6B represents the color value of a pixel that was generated using, for example, the method 100 (FIG. 1) described above. Similar to the description provided in reference to FIG. 6A, the entry 656 for a low level bit is selected so that processing can be performed to assign the entry 656 a bit value. Moreover, a determination is made regarding whether a more significant bit, at least two orders of magnitude higher than the selected bit entry 656, has a value of "1." In the example depicted in FIG. 6B, the selected entry 656 is not associated with an at least two-orders-of-magnitude higher bit value of "1" as indicated by the arrow 658. In this instance, when the result of the test performed at block 510 of the method 500 is "no," the selected bit entry 656 is assigned a bit value of "0."

Exemplary Computing Device

As mentioned previously, the techniques described herein can be applied to any device or apparatus where it is desirable to efficiently encode/decode image data. It should be understood, therefore, that handheld, portable and other computing devices and computing objects of all kinds are contemplated for use in connection with the various embodiments. Accordingly, the general purpose computer described below with reference to FIG. 7 is but one example of a computing device in which aspects of the present disclosure may be implemented.

Although not required, embodiments can partly or wholly implemented via an operating system, for use by a developer of services for a device or object, and/or included within application software or hardware that operates to perform one or more functional aspects of the various embodiments described herein. Software may be described in the general context of computer-executable instructions, such as program modules, being executed by one or more computers, such as client workstations, servers, or other devices. Those skilled in the art will appreciate that computer systems have a variety of configurations and protocols that can be used to communicate data, and thus, no particular configuration or protocol should be considered limiting.

Figure 7:
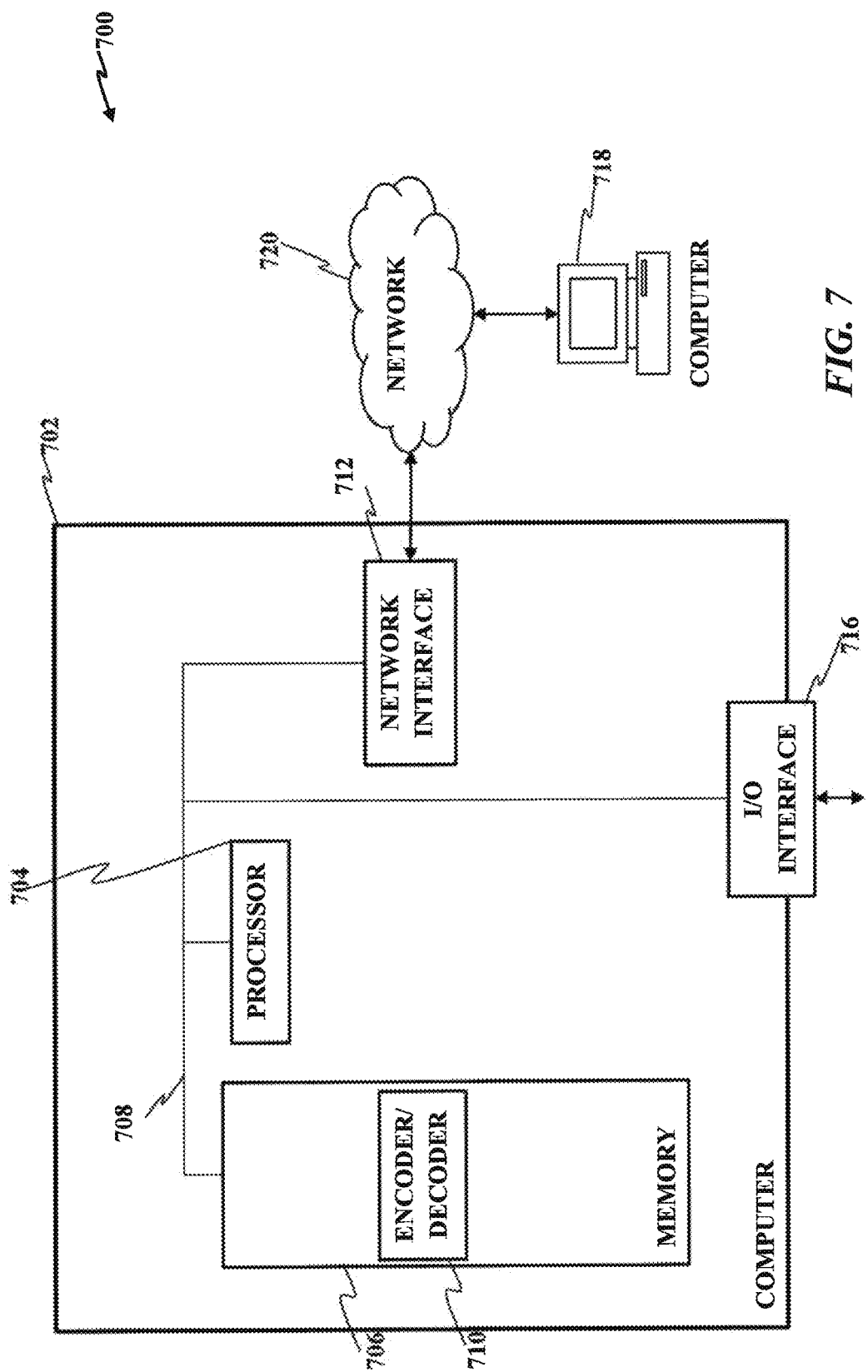
FIG. 7 is a block diagram illustrating a computing environment in which image data may be encoded/decoded in accordance with one embodiment of the present disclosure.

FIG. 7 thus illustrates an example of a suitable computing system environment 700 in which one or more aspects of the embodiments described herein can be implemented. However, as made clear above, the computing system environment 700 is only one example of a suitable computing environment 700 and is not intended to suggest any limitation as to scope of use or functionality described herein. Neither should the computing environment 700 be interpreted as having any dependency or requirement relating to any one or combination of components illustrated in the exemplary operating environment 700.

With reference to FIG. 7, an exemplary device for implementing one or more embodiments includes a general purpose computing device in the form of a computer 702. Components of the computer 702 may include, but are not limited to, a processor 704, a system memory 706, and a system bus 708 that couples various system components including the system memory 706 to the processor 704.

Computer 702 typically includes a variety of computer-readable media and can be any available media that can be accessed by computer 702. The system memory 706 may include computer storage media in the form of volatile and/or nonvolatile memory such as read-only memory (ROM) and/or random-access memory (RAM). By way of example, and not limitation, memory 706 may also include an operating system, application programs, other program modules, and program data (not illustrated). In the embodiment depicted in FIG. 7, the memory 706 includes an encoder/decoder 710 suitable for causing the processor 704 to encode/decode image data as described herein.

A user can enter commands and information into the computer 702 through input devices. A monitor or other type of display device is also connected to the system bus 708 via an interface, such as the I/O interface 716. In this regard, a monitor may be used to render or otherwise display image and video data once the data is decoded in accordance with the functionality described herein. In addition to a monitor, computers can also include other peripheral output devices such as speakers and a printer, which may also be connected through I/O interface 716. A video camera or other device capable of capturing image and/or video data may connect to the computer 702. Video data captured with this type of device may be encoded in accordance with the processes described herein.

The computer 702 may operate in a networked or distributed environment using the network interface 712 to facilitate communications and logical connections to one or more other remote computers, such as remote computer 718. The remote computer 718 may be a personal computer, a server, a router, a wireless device, a network PC, a peer device or other common network node, or any other media consumption or transmission device, and may include any or all of the elements described above relative to the computer 702. The logical connections depicted in FIG. 7 include a network 720, such as a local area network (LAN) or a wide area network (WAN), which may also include other networks/buses. Such networking environments are commonplace in homes, offices, enterprise-wide computer networks, intranets, and the Internet. As mentioned above, while exemplary embodiments have been described in connection with various computing devices and network architectures, the underlying concepts may be applied to any network system and any computing device or system in which it is desirable to encode/decode image data.

Also, there are multiple ways to implement the same or similar functionality, e.g., an appropriate API, tool kit, driver code, operating system, control, standalone or downloadable software object, etc., which enables applications and services to use the efficient encoding/decoding methods described herein. Thus, embodiments described herein are contemplated from the standpoint of an encoder/decoder as well as from a software or hardware object that compresses image data. Thus, various embodiments described herein can have aspects that are wholly in hardware, partly in hardware, and partly in software, as well as in software.

The word "exemplary" is used herein to mean serving as an example, instance, or illustration. In this regard, the subject matter disclosed herein is not limited by such examples. Moreover, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

As mentioned above, the various techniques described herein may be implemented in connection with hardware or software or, where appropriate, with a combination of both. As used herein, the terms "component," "system," "process," "method," and the like are likewise intended to refer to a computer-related entity, either hardware, a combination of hardware and software, software, or software in execution. For example, a component may be, but is not limited to, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

While the preferred embodiment of the present disclosure has been illustrated and described, it will be appreciated that various changes can be made therein without departing from the spirit and scope of the disclosed subject matter.

The invention claimed is:

1. A method implemented in instructions executed by a computer processor of separating data from a source image, the method comprising:
    arranging bytes representing pixel values from the source image into corresponding color channels;
    separating bits in each color channel into a plurality of bit planes that are ordered based on significance;
    categorizing image data represented in the bit planes into a plurality of data sets; and
    applying run length encoding to compress a first data set comprised of image data associated with one or more of the highest order bit planes.

2. The method as recited in claim 1, further comprising:
    eliminating bit values in a second data set from being included in an encoded representation of the source image, the second data set comprised of bit values from the lowest order bit planes; and
    decoding the encoded representation of the source image, wherein the decoding includes simulating values in the second data set using a randomizing function.

3. The method as recited in claim 2, wherein to simulate values in the second data set includes:
    determining whether a more significant bit at least two orders of magnitude higher than a low order bit is associated with a value indicative of color; and
    if the more significant bit is not associated with a value indicative of color, assigning a value representing a lack of color to the low order bit.

4. The method as recited in claim 2, wherein the first data set is comprised of bit values in bit planes 6 and 7 for each of the red, blue, and green color channels and wherein the second data set is comprised of bit values in bit planes 0, 1, and 2 for the blue color channel, and bit planes 0 and 1 for the red and green color channels.

5. The method as recited in claim 1, wherein categorizing image data represented in the bit planes into a plurality of data sets includes combining bits associated with adjacent pixel locations into new bytes.

6. A decoder configured to perform a method of simulating bit values of a source image, comprising:
    identifying a low-order bit in which a corresponding value was not included in a received bit stream;
    determining whether a more significant bit at least two orders of magnitude higher than the low order bit is associated with a value indicative of color;
    if the more significant bit is associated with a value indicative of color, using a randomizing function to generate a value for the low order bit; and
    if the more significant bit is not associated with a value indicative of color, assigning a value representing the lack of color to the low order bit.

7. The decoder as recited in claim 6, further comprising identifying a compression algorithm from a plurality of compression algorithms was applied by an encoder to compress a particular data set in the received bit stream.

8. The decoder as recited in claim 6, further comprising identifying and decoding a data set comprised of image data associated with the most significant bit planes encoded using Run Length Encoding.

9. The decoder as recited in claim 6, wherein the randomizing function is configured to generate an approximately equal number of 0s and 1s for being assigned to entries in the low order bit planes.

10. The decoder as recited in claim 6, further configured to apply a plurality of decompression algorithms to different data sets associated with a source image.

11. A system that applies variable compression techniques to data sets associated with a source image, comprising:
- an encoder component configured to categorize data from the source image into a plurality of data sets including at least a first data set comprised of bit values from the most significant bit planes and a second data set comprised of bit values from the least significant bit planes, compress the first data set using a first compression algorithm, and eliminate bit values in the second data set from being included in an encoded representation of the source image; and
- a decoder component configured to obtain the encoded representation of the source image, identify which compression algorithms were applied by the encoder to compress particular data sets associated with the source image, apply an inverse of the first compression algorithm to the first data set, and simulate bit values of the second data set representing the least significant bit planes.

12. The system as recited in claim 11, wherein the first data set is comprised of bit values at bit planes 6 and 7 for each of the red, blue, and green color channels and wherein the second data set is comprised of bit planes 0, 1, and 2 for the blue color channel, and bit planes 0 and 1 for the red and green color channels.

13. The system as recited in claim 11, wherein to categorize data from the source image into a plurality of data sets includes arranging bytes representing pixel values into corresponding color channels and separating bits in each color channel into a plurality of bit planes that are ordered based on significance.

14. The system as recited in claim 11, wherein the encoder is further configured to eliminate bit values in the second data set from being included in an encoded representation of the source image and wherein the decoder is further configured to simulate bit values of the second data set using a randomizing function.

15. The system as recited in claim 14, wherein the randomizing function is configured to generate an approximately equal number of 0s and 1s that are assigned to entries in the least significant bit planes.

* * * * *